May 2, 1961 R. A. WILKINS ET AL 2,982,012
STRIP MATERIAL HAVING EXPANSIBLE SLITS
Filed July 21, 1955
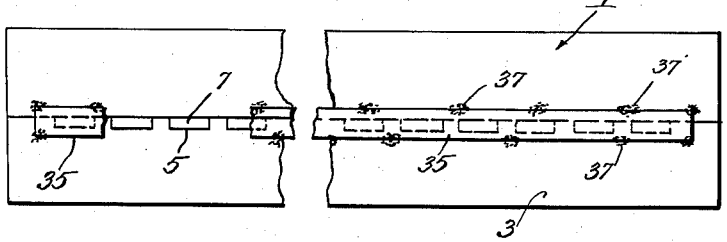
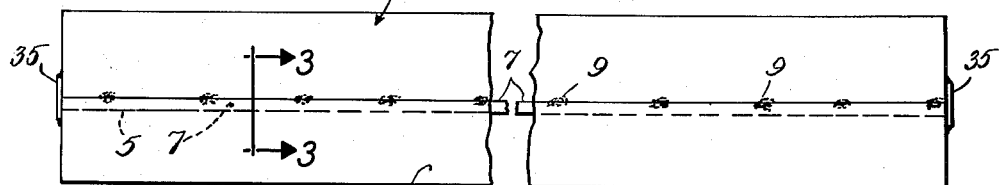
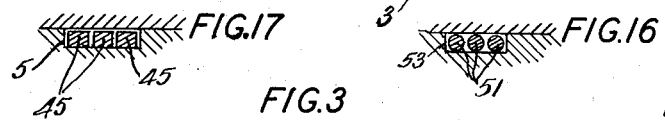
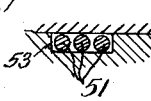
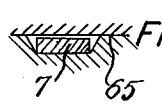
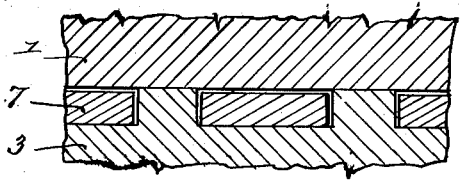
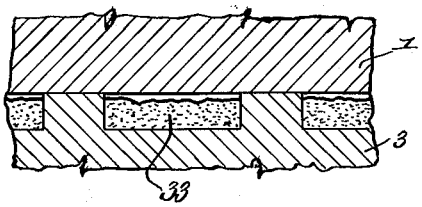
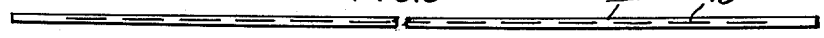
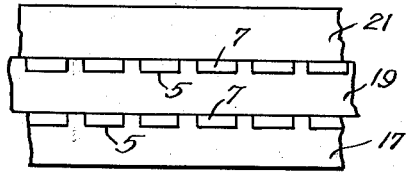
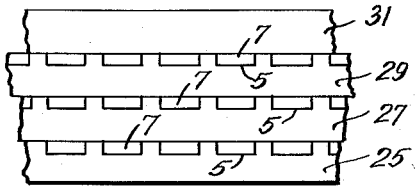
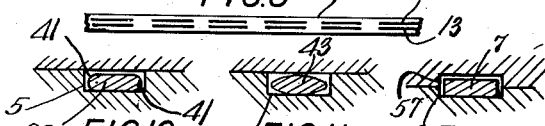
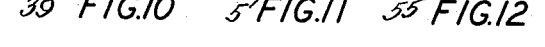
INVENTORS
RICHARD A. WILKINS
MARTIN H. DUBILIER
BY Emery Booth Townsend
Miller & Weidner ATTYS.

United States Patent Office 2,982,012
Patented May 2, 1961

2,982,012

STRIP MATERIAL HAVING EXPANSIBLE SLITS

Richard A. Wilkins and Martin H. Dubilier, Rome, N.Y., assignors to Revere Copper and Brass Incorporated, Rome, N.Y., a corporation of Maryland Filed July 21, 1955, Ser. No. 523,511

5 Claims. (Cl. 29—157)

Our invention relates to making metallic strip material having between its opposite faces one or more slits that may be expanded by introduction thereinto of pressure fluid to form fluid conducting passages or the like.

Heretofore it has been proposed to print, paint or stencil on the face of a metal strip a circuitous pattern of weld preventing substance, superimpose on such face another metal strip, secure the two strips together, and pass the assembled strips between the rolls of a rolling mill for reducing the assembly about 60% for welding to each other those portions of the opposed faces of the strips which are not masked by such pattern, in this way to produce a final strip having slits corresponding to the pattern that may be expanded in the above mentioned way. Such method, however, does not enable the welded together strips to be much thinned and elongated by the rolling operation because, among other things, the pattern formed in such way is not thick enough to contain sufficient weld preventing substance to permit that to be done, with the result that thin gauge strips cannot be produced from thick billets formed by the superimposed strips. It has been found that the distance a billet so formed and having such pattern can be elongated depends on the particular substance of which the pattern is formed but that under most favorable conditions it cannot be elongated much more than about fifty times its length, thus to produce a strip 1/50 of its thickness, without exhausting the weld preventing substance and therefore welding together the faces of the desired slits. This means that if the final strip is to be, for example, 0.010 thick the original billet having the pattern cannot be much more than about 0.5 inch thick, making the method wholly impractical for producing thin gauge strips in long lengths because of the very large labor costs involved in producing a given tonnage of the strip. It will be understood that the pattern applied in such way must necessarily be thin. If it were attempted to apply a thick pattern it would hold the opposed faces of the superimposed strips out of contact when one strip is superimposed on the other, and before the assembly could be reduced sufficiently by the rolling operation to bring such faces into contact and weld them together the thick pattern would spread laterally and cause the slits of the final strip to be of irregular width and to have irregular and ragged edges, and further would cause portions of the pattern which in the pattern as applied are spaced laterally from each other to run together so that the corresponding slits in the final strip would laterally communicate with each other.

In applicant Wilkins' co-pending application Serial Number 518,768, filed June 29, 1955, is described in method of producing long lengths of thin gauge metal strip by casting in a vertical mold and about rods of friable material a thick billet, and rolling such billet to produce the strip, the material of the rods being such that they will crush to a weld preventing powder when the billet is subjected to the rolling operation. This method, although enabling the strip to be produced at low costs comparable to those of producing ordinary metal strip, nevertheless presents the disadvantage that the material of the rods must be such as effectively to withstand the temperature at which the molten metal is poured to cast the billet and such as not deleteriously to react with the molten metal during the casting operation. For example, the two best rod materials from a mechanical standpoint which have been found suitable for use in this method are soapstone and graphite. However, soapstone, which is naturally bonded talc particles, contains water of crystallization which is driven off at the pouring temperatures of many metals, for example copper, employed for casting the billet making the soapstone rods so hard that they will not crush to yield a satisfactory weld preventing powder, thus, as between the two materials soapstone and graphite, making it advisable to employ graphite for the rods when casting metals having a high pouring temperature. Graphite however reacts with cuprous oxide ocntained in tough pitch copper to produce CO or $CO_2$ gas which tends to form blowholes in the casting about the rods, making it necessary to employ deoxidized copper when the rods are of graphite. Deoxidized copper, on the other hand, tends objectionably to pipe downward into the billet at the center portion of its upper surface as the metal solidifies, making it necessary to cut off the portion containing such piping, thus resulting in increased labor costs and scrap metal losses. Furthermore, soapstone has the above mentioned defect of hardening at the pouring temperatures of ferrous metals such as carbon steel and stainless steel, and of nickeliferous metals such as Monel metal, cupro-nickel and nickel-silver, while graphite cannot always be used as the material of the rods in casting such metals because it tends deleteriously to dissolve in ferrous and nickeliferous metals, thus making it necessary to employ when casting billets of such metals other less satisfactory and more expensive rods, for example, those formed of powdered magnesia or alumina mixed with water and a cementitious binder such as Portland cement or calcium aluminate to provide a mixture that can be poured and molded for forming the rods or forming slabs from which the rods may be cut.

According to the present invention, the strips can be produced in as thin a gauge as ever required for commercial uses and, except as limited only by the equipment available for producing them, in any lengths. For example, strips 0.015 inch thick and about 1,700 feet long can be produced by use of a billet 5 inches thick and 60 inches long, or twice that length if the billet employed were of the same length and 10 inches thick.

Furthermore, according to the present invention, the rods of friable material which crush to a weld preventing powder are never in contact with the molten metal employed in casting the billet, making it unnecessary to provide rods that can withstand the pouring temperature of the molten metal or will not react with such molten metal. As a result of this soapstone rods, for example, may be employed with metals having a high pouring temperature, such as copper, brass, bronze, carbon steel, stainless steel, Monel metal, cupro-nickel and nickel-silver, while graphite rods may be employed with tough pitch copper and in many instances may be employed with ferrous and nickeliferous metals without serious danger of dissolving into them.

The present invention, however, will be best understood from the following description when read in the light of the accompanying drawings, while its scope will be more particularly pointed out in the appended claims.

In the drawings:

Fig. 1 is an end view of one form of billet for use in the practice of the invention, with parts broken away;

Fig. 2 is a side elevation of the billet according to Fig. 1, with parts broken away;

Fig. 3 is a fragmentary section on the line 3—3 of Fig. 2, on an enlarged scale;

Fig. 4 is a section, corresponding to Fig. 3, indicating a modified form of billet for use in the practice of the invention;

Fig. 5 is an end view of a strip which may be rolled from billets according to Figs. 1 to 4, with parts broken away;

Fig. 6 is a fragment of an end view of a further modified form of billet for use in the practice of the invention, with parts omitted;

Fig. 7 is a fragment of an end view of another modified form of billet for use in the practice of the invention, with parts omitted;

Fig. 8 is a fragment of an end view of a strip which may be rolled from the billet according to Fig. 6;

Fig. 9 is a fragment of an end view of a strip which may be rolled from the billet according to Fig. 7; and Figs. 10 to 18 inclusive severally indicate further modified forms of billet according to Figs. 1 to 3, and correspond to sections on the line 3—3 of Fig. 2.

According to one specific example of the practice of the invention, a billet 5 inches thick, 12½ inches wide and 60 inches long, weighing about 1,200 pounds, is cast of copper. This billet is then rolled lengthwise to reduce its thickness to 2½ inches, which will double its length without in substance changing its width. The ends of the billet if irregular are then squared by cutting off the irregularities, and the billet sawed in halves midway its length to produce two slabs of equal length. One face of each slab is then machined to present a smooth plane surface. In such face of one of the slabs is then milled a row of spaced parallel grooves of rectangular cross-section extending longitudinally thereof from one of its ends to the other, these grooves being ½ inch wide and 3/16 inch deep and spaced ¼ inch apart, with those sides of the grooves which are adjacent the longitudinal edges of the slab spaced ¾ inch therefrom. In each groove is then laid a soapstone rod of the length of the slab, which rod is of similar cross-sectional shape to that of the groove but, as indicated in Fig. 3, slightly smaller so as to leave a slight clearance between the edges of the rod and vertical sides of the groove, and to cause the upper face of the rod to lie slightly below the upper face of the slab, so as to take care of any discrepancies in manufacture in width and thickness of the rod. On the grooved slab containing the rods is then placed the other slab with its finished surface in contact with that of the grooved slab. The two superimposed slabs are then tack welded together with copper at spaced points along their edges to produce a composite billet or package approximately 5 inches thick and 60 inches long, that is to say, one of approximately the same thickness and length as the original casting, this billet having approximately midway its thickness a row of spaced holes of rectangular cross-section extending longitudinally thereof, each containing a soapstone rod.

The above operation will produce the composite billet, according to Figs. 1, 2 and 3, having the superimposed slabs 1 and 3, the lower one at its upper finished face being formed with grooves 5 which are closed by the upper slab to form circumferentially closed holes, in each of which holes is positioned a layer of weld preventing substance in the form of a soapstone rod 7, the two slabs being tack welded together along their longitudinal edges at spaced points as indicated at 9 (Fig. 2).

The approximately 5 inch thick billet so formed may then be heated in a furnace to hot rolling temperature, and hot rolled lengthwise of the rods by passing it through the rolls of a rolling mill, and after the hot rolling is completed the billet may be pickled to remove scale and if necessary annealed, whereupon the rolling operation may be completed by cold rolling, all in accordance with usual mill practice in producing strip copper of the desired gauge and temper. Such rolling will crush the soapstone rods to a talc powder of small particle size, the hot rolling forge welding together the contacting surfaces of the slabs. The final strip produced as indicated by the strip 11 (Fig. 5) will have a row of parallel slits 13 extending longitudinally thereof from end to end. These slits will be positioned midway the opposite faces of the strip because, although the medial widthwise extending planes of the rectangular holes in the billet are slightly at one side of the corresponding medial plane of the billet, the dimensions of the billet in the direction of its thickness will be so much reduced by the rolling operation that in the final strip the distance at which the slits are spaced from the medial plane of the strip becomes so small as to be negligible.

In the above specific way of practising the invention the strip 11 may be of very small gauge as compared to the original thickness of the billet say, for example, as small as 0.007 inch if desired. The strip also will be of approximately the same width as that of the billet, and the slits therein approximately the same width as, and spaced apart the same as, the grooves in the billet. Because the powder formed by crushing the rods is confined to the holes in the billet it will be spread or otherwise extended along such holes continuously as they are flattened to form the slits, and along such slits. The flattening of the holes takes place at a greater rate than the thinning of the billet, so that long before the billet is reduced to its final thickness opposie sides of the holes will be brought practically into contact, with an extremely thin and attenuated layer of the powder between them, sufficient of this powder being present throughout the entire rolling operation to prevent any hot or cold welding together of such substantially contacting sides. As viewed in a section cut transversely of the strip, slits appear as very thin whitish lines, this color being due to the thin layer of talc between the faces of the slits. As the soapstone powder is not malleable like the copper, and, as above explained, the holes in the billet tend to flatten faster than the reduction in thickness of the billet, there will be an excess of the talc powder in such holes and particularly during the first part of the hot rolling operation, which excess will be squeezed from those ends of the holes which advance toward the rolls. No such discharge of the talc powder can ordinarily be observed after the thickness of the 5 inch thick billet is reduced to about ¼ inch, at which point in reduction the holes will be flattened to form slits of the same characteristic appearance when viewed in transverse cross-section as those in the final strip except that the whitish lines indicating the slits are somewhat heavier.

It will be understood that the long lengths of strip produced may, in accordance with the usual mill practice, be coiled to form cylindrical coils, and shipped in that form from the mill to the users of the strip who may cut the strip into shorter lengths to suit their needs.

When the strip is to have two rows of slits 13, for example as shown in the strip 15 of Fig. 8, the billet may be formed of three superimposed slabs 17, 19 and 21 (Fig. 6) which are preferably cut from the cast billet after it has been rolled to elongate it about threefold. As indicated in Fig. 6, the slabs 17 and 19 may be formed at their upper finished faces with the grooves 5, in each of which grooves is laid one of the rods 7.

Similarly, when the strip is to have three rows of slits 13, as shown by the strip 23 of Fig. 9, the billet may be formed of four slabs 25, 27, 29 and 31 as shown in Fig. 7, the upper finished surfaces of the three lowermost slabs as viewed in Fig. 7 being formed with the grooves 5 in which are placed the rods 7.

It will be understood that, instead of tack welding the slabs together at the edges of their interfaces with the same metal as that of the slabs, which is the preferred way of securing them together, they may be otherwise welded or brazed together with any suitable metal or alloy, or be secured together in any of the known ways of forming so-called "packages" or composite billets, for example, in any of the known ways of forming "packages" which are to be rolled for forge welding together the component slabs of a billet for producing "bi-metal."

If desired, the hereinbefore mentioned clearance about the rods and the walls of the holes in the billet may be made sufficient to permit the rods to be slid endwise into such holes. However, whether such rods are so inserted or are laid in the grooves prior to superimposing the billets, they are, when long, expensive to produce, and commonly are fragile and thus difficult to handle without rupturing. Consequently with long billets the rods placed in the grooves may be in short endwise abutting lengths, broken fragments of rods, or other pieces.

Similarly, instead of placing rods in the grooves, there may be placed in them powdered weld preventing substance as indicated at 33 (Fig. 4), the grooves preferably being of such depth that sufficient powder will be contained therein when they are filled, or filled to very slightly below their upper edges as indicated on an exaggerated scale in Fig. 4 so as to leave sufficient clearance as not to interfere with the superimposed slab making proper contact with the slab on which it is superimposed. Such clearance, however, should not be great enough to cause one end portion of the billet to be emptied in respect to the powder if the billet is stood on end or the like to cause the powder to run toward the opposite end portion of the hole. For preventing escape of the powder when the billet is being handled preparatory to rolling it, the ends of the grooves containing such powder may be provided with suitable closures, for example, closures formed by thin gauge metal strips 35 (Figs. 1 and 2), of any suitable metal, but preferably the same metal as the billet, extending over the ends of the holes formed by the grooves, which strips may be secured in place in any suitable way, for example, by brazing or tack welding them to the billet at spaced points along their edges as indicated at 37. Such strips, or the welding or other means securing them to the billet, will rupture when the billet is first passed through the rolls of the mill to reduce it, and thus permit escape of any excess powder during the rolling operation. When the rods are employed and are inserted endwise into the holes in the billet the welded on strips 35 may be employed for preventing any possibility of the rods after being so inserted sliding from such holes when the billet is being handled preparatory to rolling it. Likewise, these welded on strips may be employed when the rods are formed of short sections extending lengthwise thereof, or of fragments of rods or the like, for preventing such escape of those sections or fragments.

Likewise, instead of employing weld preventing substance in the form of rods or powder in the holes of the billet, such substance may be in the form of a paint-like or paste-like suspension of finely divided particles of such substance applied to the surfaces of the holes in the billet, or to the surfaces of the grooves prior to superimposing the slabs. By so applying the substance an adhering layer in the form of a coating of such substance as thick as may be desired may be placed in the holes or grooves without in any way interfering with the welding together of those surface portions of the slabs which lie between the grooves. Such coating or layer will be crushed or otherwise broken down to a powder when the billet is rolled.

Preferably the rods are of rectangular cross-section although, to prevent possible chipping of their lengthwise extending corners, they may if desired have their opposite edges rounded as indicated by the rod 39 (Fig. 10) having the rounded edges 41. Also the rods, if desired, may be of flat oval cross-section as indicated by the rod 43 of Fig. 11. Furthermore, the rods transversely thereof may be in the form of sections, as indicated by the three sections 45 of Fig. 17. When the slits to be produced in the strips are of relatively narrow width there may be placed in the grooves of correspondingly narrower width, say ¼ inch or less, rods of circular cross-section, as indicated by the rod 47 (Fig. 13), received in the narrow groove 49. Likewise, when the widths of the grooves permit, the rod transversely thereof may be in the form of longitudinally extending sections of circular cross-section as indicated by the sections 51 (Fig. 16) contained in the groovce 53.

It is not necessary that the groove be confined to but one of the slabs at the interface of two slabs, but the groove may be formed in two parts 55 and 57 (Fig. 12), or parts 59 and 61 (Fig. 14), one of which parts in each instance is formed in one slab and the other part in the other slab.

Applicants have found that by milling or otherwise machining grooves in the slabs and placing the weld preventing substance in such grooves, the slits formed in the rolled strip are of great uniformity in respect to their spacing, widths and wall thickenesses, and commonly more so in such respects than can be had with assurance by rolling a billet in which the metal is cast about rods of the weld preventing substance.

Preferably the grooves in all the above modifications of the billet are of rectangular cross-section, as it has been found that with such cross-sections the slits produced have sharply defined regular edges. The edges of the grooves, however, may be rounded as indicated at 63 (Fig. 15), or may be outwardly and upwardly inclined as indicated at 65 (Fig. 18). However, with such edges it has been found that there is sometimes a tendency for the edges of the slits produced to be somewhat irregular and ragged. Although this defect does not necessarily preclude the use of such edges, such use is preferably avoided to insure against such defect.

It will be understood that the amount of weld preventing substance in the grooves or holes in the billet is readily controlled by the effective thickness of the layer of weld preventing substance in said grooves presented by the rods, powder, or paint-like or paste-like suspension of such substance placed in them. By appropriately regulating such thickness the billet may be reduced by the rolling operation to produce strips of very small gauge without rupture of the metal at the faces of the slits due to there being placed in the grooves so much weld preventing substance that the excess amount thereof will not be squeezed from the holes in the billet during the rolling operation. The thickness of these layers is in no way critical. For example, it has been found that a copper billet having rectangular grooves from 0.4 to 1 inch wide, substantially completely filled with graphite or soapstone rods of thicknesses in each instance of such width varying from ⅛ to ¼ inch, can be successfully rolled in this respect to produce strips as thin as 0.007 inch, which, except for use in fabricating automobile radiators and the like, is a much smaller gauge than ordinarily would be employed in commercial practice where the gauge seldom would be less than about 0.015 inch. In all these instances, and regardless of the thickness of the layer of weld preventing substance, the amounts of weld preventing substance in the slits of the final strip produced are substantially the same in so far as any practical difference is concerned. It will be understood that when the guage of the strip to be produced is not too small, say not less than about 0.015 inch, the cross-sectional dimensions of the grooves and the effective thicknesses of the layers of weld preventing substance therein may be varied within wide limits. For example, but without limitation thereto, rectangular grooves practically filled with weld preventing substance have been successfully employed having cross-sections as follows: ¼ inch wide and ⅛ to ¼ inch deep, ½ inch wide and ⅛ to ½ inch deep, ¾ inch wide and ³⁄₁₆ to ½ inch deep, 1 inch wide and ³⁄₁₆ to ¾ inch deep, and 1½ inches wide and ¼ to 1 inch deep. There is apparently no limitation on the minimum thickness of the layers of weld preventing substance placed in the grooves other than that imposed by the length of the strip to be produced from a billet of given length and thickness. However, when the layers of weld preventing substance placed in the grooves are in the form of rods of continuous length, the depths of the grooves preferably are such that rods not less than about ⅛ inch thick may be employed, as otherwise the rods become unduly fragile and increasingly difficult to fabricate, handle and install in the billet without their rupturing. With rods of this thickness much more than sufficient weld preventing powder will be formed from them than necessary to prevent welding of the opposite faces of the slits to each other in producing strips of any practical gauge down to about 0.020 inch, or with rods about 3/16 inch thick down to about 0.007 inch gauge, from billets of any thickness commonly employed in commercial mill practice of rolling non-ferrous metals to produce strip material. Because different metals are of different plasticity and consequently reduce at different rates when rolled by the same equipment, and the equipment available varies, and one weld preventing substance may spread along the holes and slits more readily than another weld preventing substance, causing, if such substance is in the form of a powder or is reduced to a powder, a different amount of excess of such substance to be squeezed from the holes during the rolling operation, the minimum thicknesses of the layers of powder and paint-like or paste-like suspension, and effective thicknesses of the rods in respect to producing powders, necessary to secure slits when reducing a billet of given length and thickness to produce a strip of given gauge, are not susceptible of definition by any general mathematical formula. However, layers of such powder or suspension filling grooves of the convenient depth of about 3/32 to 5/16 inch, and rods of such cross-section that will produce such depth of powder regardless of the depths of the grooves, it has been found will produce satisfactory slits in reducing billets from 2 to 10 inches thick to form a strip of as small a gauge as 0.007 inch when the billets are up to 10 feet long.

The widths of the grooves also are not critical. However, it has been found that best results will be secured during the rolling operation if such widths do not exceed about 1½ inches. When the slits are to be wider than the grooves, say greater than 1½ inches wide, or where the rods of weld preventing substance available are of unsuitable width with respect to the widths of the grooves, the billet may be "cross rolled" at the initial portion of the rolling operation thereon to widen the grooves while flattening them. Such cross rolling, it will be understood, consists in rolling the billet in a direction transverse to its length, or in a direction "diagonal" to its length so as to have a component of rolling transverse to such length, in each instance to "elongate" the billet transversely.

Besides forming the billets of copper other hot and cold rollable and workable weldable metals may be employed such as aluminum, zinc, and various alloys such as brasses of various compositions, bronzes of various compositions, silicon-copper of various compositions, Monel metal, cupro-nickel of various compositions, nickel-silver of various compositions, stainless steel of various compositions, carbon steel of various carbon content, and other alloys almost too numerous to mention. The most important metals for ordinary uses of the strip are copper, aluminum, zinc and 70:30 brass.

In all these instances of metals the billet may be rolled in accordance with usual mill practice of rolling billets to produce strip of the particular metal involved. According to these practices the rolling operation comprises first hot rolling the billet, and that will forge weld together the slabs of which the billet is composed. To reduce costs in producing the strip the billet is as thick as available rolling facilities will permit, which thickness ordinarily will be from 5 to 9 inches. Nevertheless, when the rolling equipment available necessitates it, thinner billets may be employed. However, economic considerations would ordinarily preclude the use of billets less than 2 inches in thickness.

In respect to the metals of which the billet is formed, it will be understood that elemental metals are not necessarily used commercially in their pure form for fabricating shapes such as strips but are often deliberately or otherwise alloyed with small amounts of other metals or metalloids. For example, what commercially is ordinarily termed "aluminum" in connection with fabricated shapes often is aluminum containing one or more of the substances manganese, magnesium and silicon, while what commercially is ordinarily termed "zinc" in connection with fabricated shapes commonly is zinc containing impurities such as lead and cadmium, and in some instances also small amounts of iron, copper, tin, etc., and even as has heretofore been proposed may contain metals or metalloids deliberately added for improving its properties. It will therefore be understood that hereinafter and in the appended claims, where the context permits, by reference to an elemental metal, for example, "copper," "aluminum" and "zinc," are included, besides the substantially pure metal, alloys of which such metal constitutes the base constituent in the sense that copper constitutes the base constituent of what is termed in the art a "copper-base" alloy.

It has been found that in many instances the metal of the original casting tends to be porous along its outer surfaces particularly its edge surfaces, such porosity extending into the body of the casting an appreciable distance. Best results are secured if the grooves do not extend through this porous zone. Ordinarily so placing the grooves that in the billet they are spaced from its side and edge surfaces not less than about ¾ inch will amply provide such spacing.

Graphite and soapstone are preferably employed as the material of the rods hereinbefore described because of their machinability rendering them capable of being readily and inexpensively fabricated, and further because the rods of such materials are readily and quickly crushed during the rolling operation to form a body of weld preventing powder which effectively elongates with the billet so as to extend continuously along the holes in the billet, and along the slits formed by flattening of such holes, as the billet is being thinned and elongated. The rectangular rods formed of these materials may be readily cut by use of a bandsaw or the like from graphite or soapstone slabs of thicknesses equal to the widths of the rods to be produced. When the rods are of non-rectangular cross-section they may be readily formed by an appropriate machining operation on the rectangular rods sawed from the slabs, and particularly when the rods are made in relatively short longitudinally extending sections, in which case the machining operation may be performed on such sections. The soapstone slabs may be those commonly furnished by the soapstone quarries. The graphite slabs may be made in a known manner by mixing broken anthracite coal, petroleum coke, or other suitable forms of carbonaceous material, with a coal tar binder to form a mass which may be molded to the shape of the slabs. The molded slabs may then be placed in a so-called "graphitizing furnace" of a known construction and heated to crack the organic constituents of the coal tar and drive off its volatiles whereby to produce slabs of hard carbon. By raising the temperature and prolonging the heat treatment in the furnace the hard carbon is changed to graphite.

Besides forming the rods of graphite and soapstone they may, as hereinbefore indicated, have as their basic constituent other substances, such as talc, china clay, magnesia and alumina, that will not deteriorate at the hot rolling temperature of the billet. These substances in powder form may be mixed with water and a suitable powdered binder, such as Portland cement or calcium aluminate, that will not deteriorate and lose its efficacy as a binder when the billet is heated to hot rolling temperature. These mixtures may, like ordinary concrete, be poured into molds and molded therein under pressure to form slabs, which latter after they "set" may be removed from the molds and permitted to air dry sufficiently to allow them to be handled and the rods to be sawed from them. When the rods are of non-rectangular cross-section, and if desired even when they are of rectangular cross-section, they may be directly molded under pressure from the mixture instead of first forming the slabs and sawing them from such slabs. However, it is quite feasible to machine the sawed rods, or pieces thereof when the rods are formed of longitudinally extending sections, to give them the desired cross-section as explained above in connection with the graphite and soapstone rods. The rods however produced may, preparatory to using them, be baked in a furnace at a moderate temperature, say about 250° F., to drive off any moisture contained in them. The amount of binder in the above mixture need be no more than sufficient to hold the particles of the rod together so as to enable the rod to be readily handled and installed in the grooves. The amount of binder is thus not critical, and applicants have found that anywhere from 5 to 30% Portland cement or calcium aluminate will suffice in this respect. Such rods, when the billet containing them is rolled, will, like graphite or soapstone, crush to form a weld preventing powder.

The rods also may be formed of mica ground in a pebble mill or the like with water to form a water suspension of mica particles. The excess water may be removed from the suspension by subjecting the mass to pressure, after which the resulting wet mass may be molded under pressure to form the rods. Alternately, and preferably, the wet mass of mica particles may be molded under pressure into slabs which may be air dried and then baked to remove the moisture, and the rods sawed or otherwise cut from these slabs. The rods sawed from these mica slabs may also be machined to give them the desired cross-section. The mica rods will crush during the rolling operation on the billet to form a weld preventing powder of mica.

When the weld preventing substance is placed in powder form in the grooves of the billet such powder may be of any of the materials hereinbefore described in connection with the rods.

Any of the rods, powders or suspensions above described may be employed with any of the metals hereinbefore referred to. However, at the hot rolling temperatures of many ferrous metals such as stainless steel and carbon steel, and of many nickeliferous metals such as cupro-nickel, nickel-silver and Monel metal, graphite tends somewhat to dissolve into the metal, while the water of crystallization contained in soapstone, talc and mica tends at such temperatures to be driven off to make such materials at times more or less unsatisfactory. Consequently, with such ferrous and nickeliferous metals, rods having as their basic constituent china clay, alumina or magnesia, or like inert substances, or powders of these materials, are preferably employed. With non-ferrous and non-nickeliferous metals soapstone or graphite rods or powders are preferably employed.

As hereinbefore indicated, the weld preventing substance entered into the grooves in the slabs or holes in the billet may be in the form of a paint-like or paste-like suspension of finely divided particles. That suspension may be of any of the hereinbefore mentioned powders. For example, it may be the mixture of any of such powders with water and Portland cement or calcium aluminate, hereinbefore described. It also may be a water or volatile liquid suspension of colloidal graphite or colloidal mica, preferably a suspension in a volatile liquid such as alcohol. Such suspensions may be applied to the holes in the billet or to the grooves in the slabs in any convenient manner. When it is of sufficiently fluid consistency it may be applied to the grooves by means of a brush, several layers being applied in such manner to secure the desired thickness, or may be sprayed into the holes in the billet after the billet is assembled. When it is in paste-like form it may be applied to the grooves before the billet is assembled. When the suspension, in whatever form it is applied, dries it will cause the grooves or holes to contain a friable layer of weld preventing substance in the form of a coating on its walls.

When the billet is of aluminum the layer of weld preventing substance in the grooves of the slabs or holes of the billet may be formed by thickly coating the surfaces of such grooves or holes with aluminum oxide. This may be done by treating such surfaces with a dilute, say 10%, water solution of sodium hydroxide which will react with the aluminum to coat such surfaces with aluminum hydroxide which will break down to form a coating of the aluminum oxide in finely divided form when the billet is heated to the forge welding and hot rolling temperature. The ends of the grooves in the slabs or holes in the billet may be blocked to permit them to be filled with such solution, and after a brief period sufficient to cause the necessary reaction to occur such blocking may be removed and the grooves or holes drained. When necessary, for further insuring that the grooves or holes will contain enough weld preventing substance the aluminum hydroxide coatings may be further coated with a substance such as silicone (organic silicon dioxide polymer) in liquid or grease-like form. Conveniently the silicone coating may be applied to the holes of the billet by spraying it in liquid form into such holes, and may be applied to the grooves of the slabs by swabbing the coated grooves with silicone in grease-like form. When the billet is heated to the forge welding and hot rolling temperature the silicone will break down to finely divided silicon dioxide more or less mixed with the coating of finely divided aluminum oxide formed by breaking down of the aluminum hydroxide. These coatings will crush to a powder when the billet is subjected to the rolling operation.

It will be understood that within the scope of the appended claims wide deviations may be made from the forms of the invention herein described without departing from the spirit of the invention.

We claim:
1. The method of making long lengths of internally slitted metal strip of the character described which comprises lengthwise rolling one or more thick billets of a given metal selected to be hot weldable and rollable and cold workable thereby to form slabs of such selected metal, superimposing a plurality of such slabs in face to face contact after first face-wise longitudinally grooving at least one of them with one or more grooves of flattened transverse cross-section, such as rectangular, and having the major cross-sectional dimension of the grooving parallel to the grooved slab face, said superimposition closing the open area of the grooving and defining between contacting slabs the like number of circumferentially closed holes also of flattened transverse cross-section and likewise with the major cross-sectional dimension of the holes parallel to said contacting slab faces and with said holes extending longitudinally of the slabs throughout the length thereof, attendantly placing in the space defined by the grooving substantially filling quantities of weld-preventing substance so selected that at the hot forge welding temperature and hot rolling temperature of the metal said substance is physically and chemically stable and inert with respect to the metal, heating the so superimposed slabs to forge welding temperature with the weld preventing substance placed in said holes, pressing the so heated superimposed slabs relatively toward each other for welding the slabs together throughout their interface except at the zones of said holes, and rolling the so formed composite billet in the direction of the lengths of said holes materially to elongate and thin it for moving substantially into contact those opposite sides of said holes which are parallel to the faces of the billet so as to form the slits and for continuously extending and attenuating said weld preventing substance into an attenuated layer along said holes and slits, whereby to form said slitted strip material.

2. The method according to claim 1 in which the pressing operation on the superimposed slabs for welding them together is performed by rolling them, which rolling is continued for elongating and thinning the composite billet.

3. The method according to claim 1 in which the weld preventing substance placed in the grooves is in the form of a powder.

4. The method according to claim 1 in which the pressing operation on the superimposed slabs for welding them together is performed by rolling them, which rolling is continued for elongating and thinning the composite billet, and the weld preventing substance placed in the grooves is in the form of a powder.

5. The method according to claim 1 in which the pressing operation on the superimposed slabs for welding them together is performed by rolling them, which rolling is continued for elongating and thinning the composite billet, the weld preventing substance placed in the grooves being in massive form and capable of being pulverized to a fine weld preventing powder at the initial portion of the rolling operation.

References Cited in the file of this patent

UNITED STATES PATENTS

| | | |
|---|---|---|
| 29,276 | Holmes | July 24, 1860 |
| 377,318 | Marshall | Jan. 31, 1888 |
| 726,026 | Canda | Apr. 21, 1903 |
| 2,039,040 | Trembour | Apr. 28, 1936 |
| 2,333,343 | Sendzimir | Nov. 2, 1943 |
| 2,375,334 | Valyi | May 8, 1945 |
| 2,498,275 | Johnson | Feb. 21, 1950 |
| 2,690,002 | Grenell | Sept. 28, 1954 |

FOREIGN PATENTS

| | | |
|---|---|---|
| 401,476 | Germany | Sept. 8, 1924 |